May 27, 1969 D. E. WOLFORD 3,446,424
BLOWER DEVICE
Original Filed July 20, 1965 Sheet 1 of 4
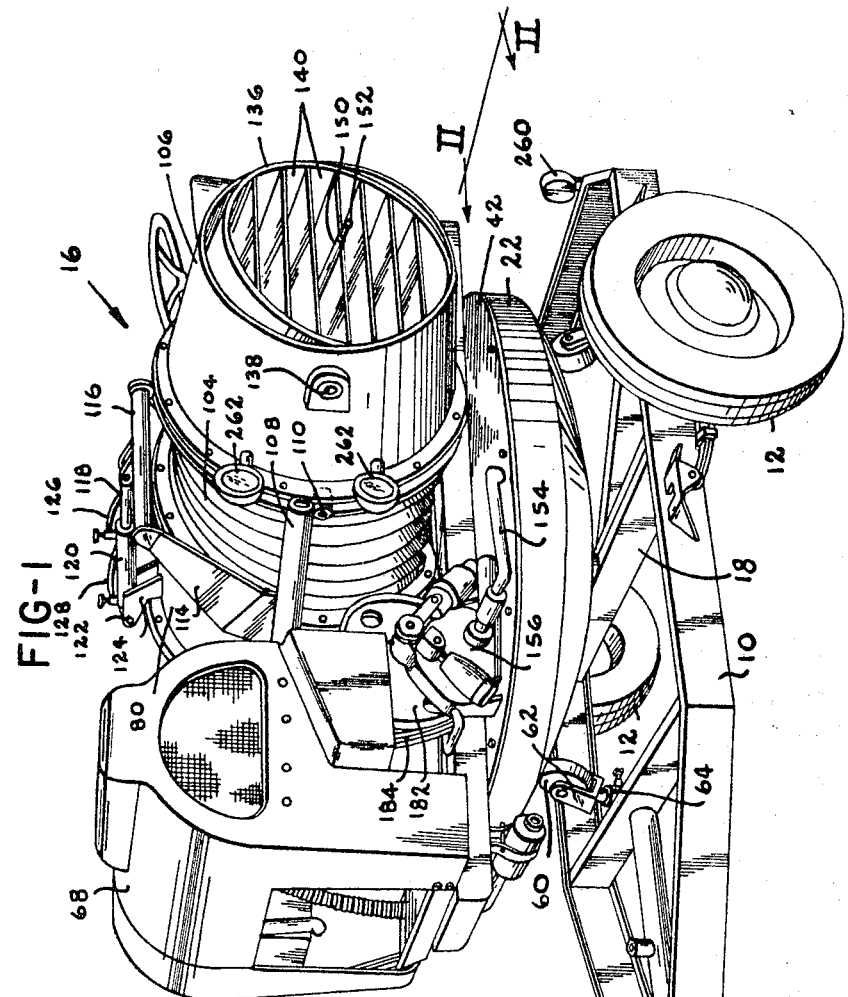
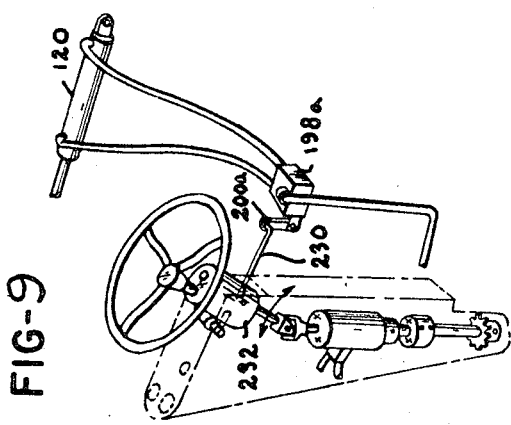
INVENTOR.
DALE E. WOLFORD
BY
Melvin A. Crosby

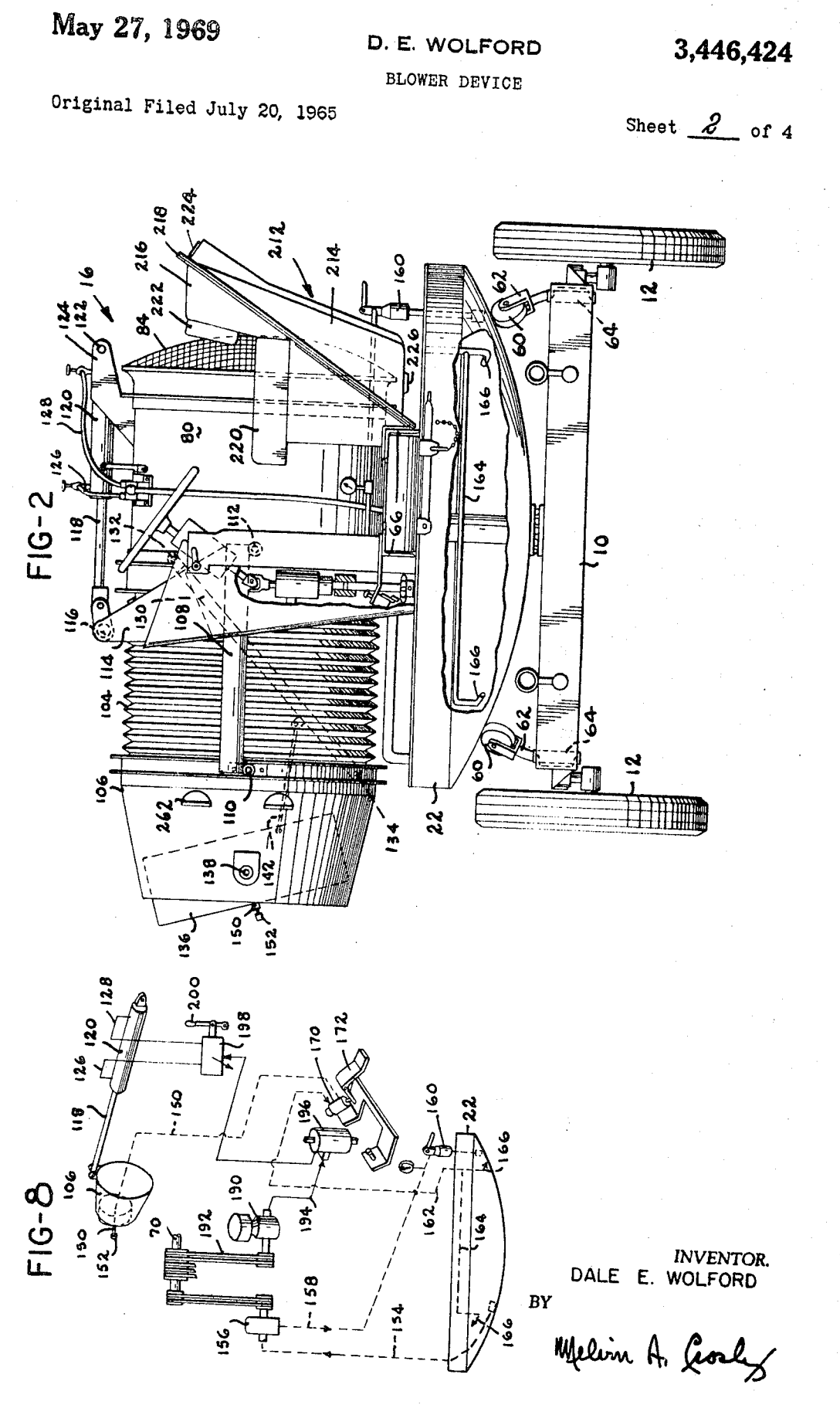

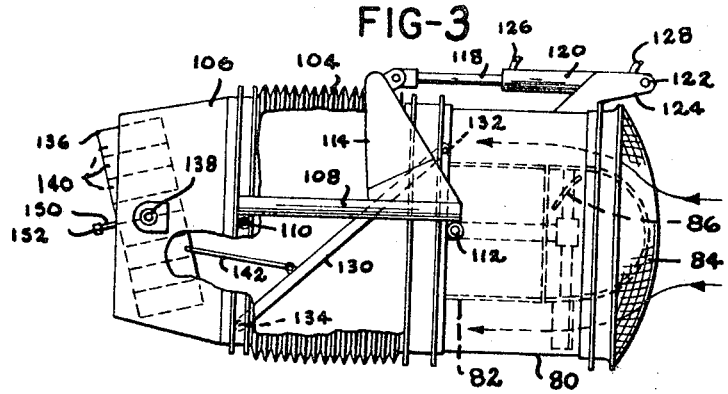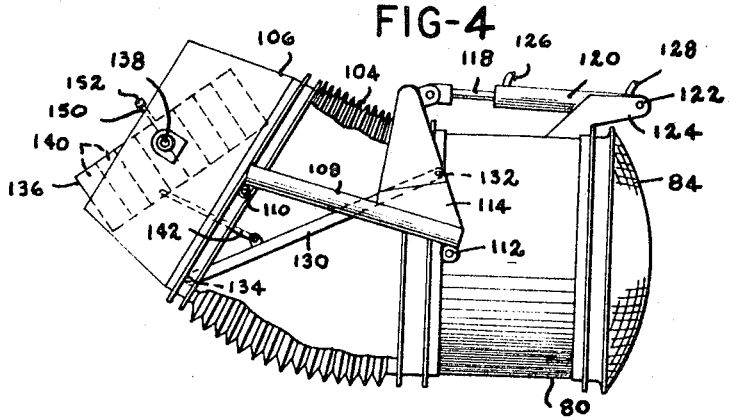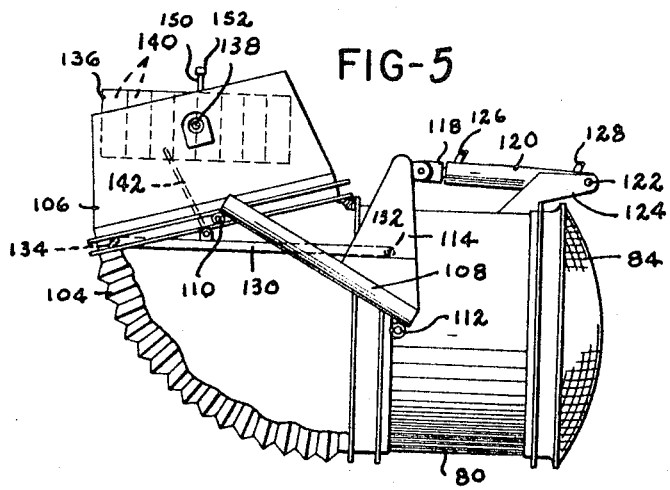

May 27, 1969

D. E. WOLFORD 3,446,424

BLOWER DEVICE

Original Filed July 20, 1965

INVENTOR.
DALE E. WOLFORD
BY
*Melvin A. Crosley*

United States Patent Office 3,446,424
Patented May 27, 1969

3,446,424
BLOWER DEVICE
Dale E. Wolford, Ashland, Ohio, assignor to The F. E. Myers & Bro. Co., Ashland, Ohio, a corporation of Ohio
Original application July 20, 1965, Ser. No. 476,074, now Patent No. 3,319,890. Divided and this application Mar. 15, 1967, Ser. No. 623,468
Int. Cl. F04d 27/00; F04f 11/00
U.S. Cl. 230—114                                              7 Claims

ABSTRACT OF THE DISCLOSURE

Blower device having a tiltable discharge member with a tiltable guide member in the discharge member and linkage to cause tilting of the members in unison.

Cross-reference to a related application

This application is a divisional application of my copending application Ser. No. 476,074, filed July 20, 1965, now Patent No. 3,319,890.

Background of the invention

This invention relates to a blower device, and is particularly concerned with a blowing device which is extremely flexible in operation, and which is particularly well adapted for use in a sprayer for spraying individual trees, such as might be found along a street or boulevard, or the like.

Spraying machines or devices of the mobile or portable type are, of course, well known. Such devices are employed for the treatment of vegetation of all types including trees. Most tree spraying machines or devices are of the type that are drawn through orchards where the trees are arranged in more or less unifom rows, and whereby the machine can be arranged to discharge laterally from one or both sides and thereby adequately treat at least one side of each tree as it is drawn thereby.

While such spraying devices have proved generally adequate for use in orchards, the machines have been somewhat lacking in providing a device suitable for treating individual trees. The spraying devices, according to the prior art, have also been lacking in flexibility, by which is meant the particular direction in which the spray material from the device can be directed, and have also been lacking in fineness of control of the delivery of the spray material to the vehicle blast of air normally employed in connection with spraying devices of this nature.

More recently, there have been developed spraying machines which are particularly adapted for spraying individual trees and for applying spray material in relatively inaccessible locations and being operable for applying spray material in a somewhat different manner than has heretofore been possible, for example, substantially straight upwardly beneath a tree so as to penetrate the foliage of the tree from the inside outwardly rather than from the outside inwardly as is usually the case.

Summary of the invention

With the foregoing in mind, it is a primary object of the present invention to provide a blower for use with a spraying device or machine of the nature referred to, which is improved as to construction and performance.

Another object of this invention is to provide a blower device which is extremely flexible in operation in that it can direct its blast to regions which would otherwise be substantially inaccessible.

Another particular object of the present invention is the provision of a blower device especially adapted for use with a portable or mobile spraying apparatus in which a vehicle air blast is developed into which the spray material can be introduced for being conveyed by the air blast to the region to be treated, and wherein the blower device is rotatable through an angle of 360° on a supporting framework and is also tiltable from a substantially vertical direction to a generally downwardly direction, thereby providing for the application of the spray material in substantially any direction.

Another object of the present invention is the provision of a blower device in which the tilting of the apparatus to direct the blast therefrom either upwardly or downwardly, is accomplished by relatively simple straightforward means as opposed to complex structures heretofore known in this art.

Brief description of the drawings

The foregoing objects and other objects and advantages of the present invention will become more apparent upon reference to the following detailed description taken in connection with the accompanying drawings, in which:

FIGURE 1 is a perspective view showing a spraying apparatus having a blower device associated therewith, constructed according to the present invention;

FIGURE 2 is a view looking in from the rear of the spraying apparatus of FIGURE 1, as indicated by the line II—II, toward the right side of FIGURE 1;

FIGURES 3, 4 and 5 are views showing different adjusted positions of the discharge nozzle of the blower device for directing the air blast therefrom in different directions in a vertical plane;

FIGURE 8 is a schematic view showing the fluid systems of the spraying apparatus, including the system by means of which chemical is supplied from the supply tank to the nozzle located in the path of the air blast, and also showing the hydraulic system which supplies pressure fluid to the motors of the spraying apparatus which actuate the parts thereof in the required movements of the said parts; and FIGURE 9 is a somewhat schematic perspective view showing how the tilting of the discharge nozzle of the spraying device can be coordinated with the steering wheel of the device so that tilting of the steering wheel in the fore and aft direction will bring about tilting of the discharge nozzle in the vertical plane.

Figure 6:
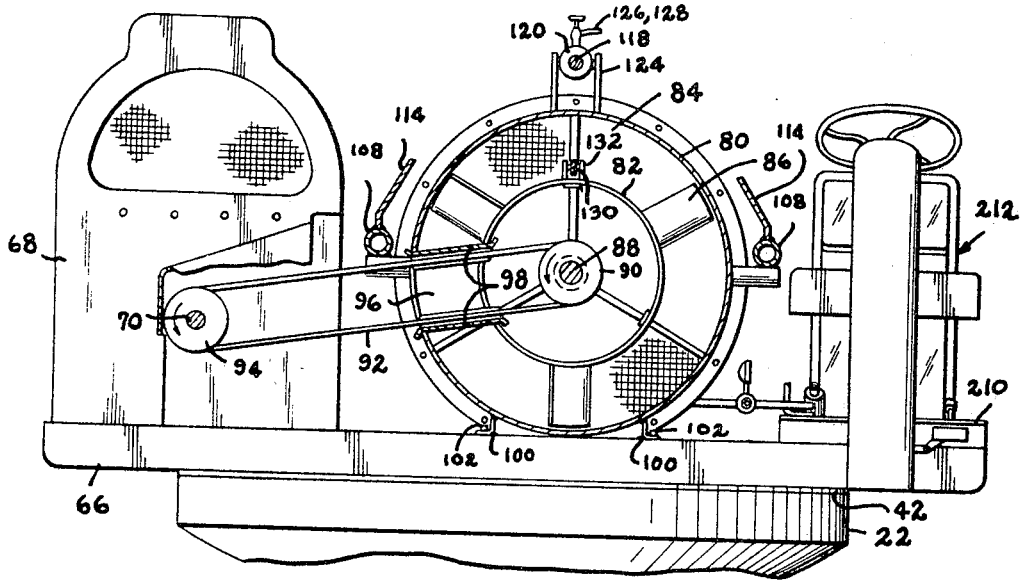
FIGURE 6 is a transverse section through the blower device.

Description of the operation of the preferred embodiment

The spraying machine having a blower device according to the present invention comprises a chassis or frame 10 which may be made up, for example, of channel irons interconnected in any suitable manner. The frame carries the support wheels 12, near the back, and toward the front hitch means 14 is provided on the frame by means of which the spraying apparatus can be connected to a draft implement such as a tractor. Mounted on the frame is the spraying apparatus device having a blower according to the present invention, and generally indicated at 16. This spraying apparatus is an entirely self-contained unit in that it includes means for developing a blast of air, and means for supplying treatment material to the blast of air, and means for directing the blast of air with the entrained treatment material in any desired direction.

The spraying apparatus includes a tank 22 for the treatment material which forms a part of the apparatus so that the spraying apparatus in its entirety forms a subunit. As will be seen in FIGURES 1 and 2, the chassis or frame 10 comprises a transversely extending portion 18, and fixed in this portion 18 and extending upwardly therefrom, is a shaft which extends completely through tank 22. Tank 22 has a central opening therein in which is mounted a sleeve which rotatably surrounds the said shaft.

In the described manner, the tank is rotatably supported on the frame or chassis and can be turned thereon by the application of a relatively small amount of force.

It will be evident that tank 22 is for the purpose of containing the treatment liquid that is to be employed in the spraying apparatus. The tank thus requires adequate support and according to the present invention there is provided a plurality of rollers 60 carried by frame or chassis 10, and distributed about the periphery of tank 22 and disposed so as to engage the underside of the tank at spaced points in a circumferential region thereof spaced outwardly from the center. Each roller 60 is supported in a fork-like support member 62 that is adjustably received in a socket 64 in the frame or chassis 10 provided therefor so that the rollers can be adjusted into firm supporting engagement with the tank.

The tank will thus rotate freely at all times and movement of the liquid within the tank will not unduly load the bearings thereof or cause any wobbling of the equipment on the frame. Rollers 60 may advantageously be rubber covered to prevent abrasion of the tank and to silence the rollers as they roll over the surface of the tank and to eliminate shock upon any tendency of the tank to tilt.

The spraying apparatus proper comprises a blower device consisting of the drive motor and the blower and other mechanism which is mounted on the cover 42 of the tank on a pair of spaced angle members 66 extending across the tank and bolted thereto in any suitable manner, as by angle clips welded to the tank cover and upstanding therefrom.

The spaced angles 66 are interconnected at the opposite ends so that the angles form a supporting framework for the drive engine and the blower whereby this portion of the spraying apparatus can be constructed and assembled independently from the tank and subsequently assembled therewith.

The engine, not shown in detail, is contained within a housing 68 at one end of the supporting framework, and the said engine includes an output shaft 70. The output shaft 70 has pulleys thereon which drive the several auxiliaries pertaining to the spraying apparatus, including the blower, a pump for applying pressure to the treatment material so that it can be injected into the air blast, and a hydraulic pump for developing hydraulic pressure for controlling the hydraulically operable portions of the spraying apparatus.

Figure 7:
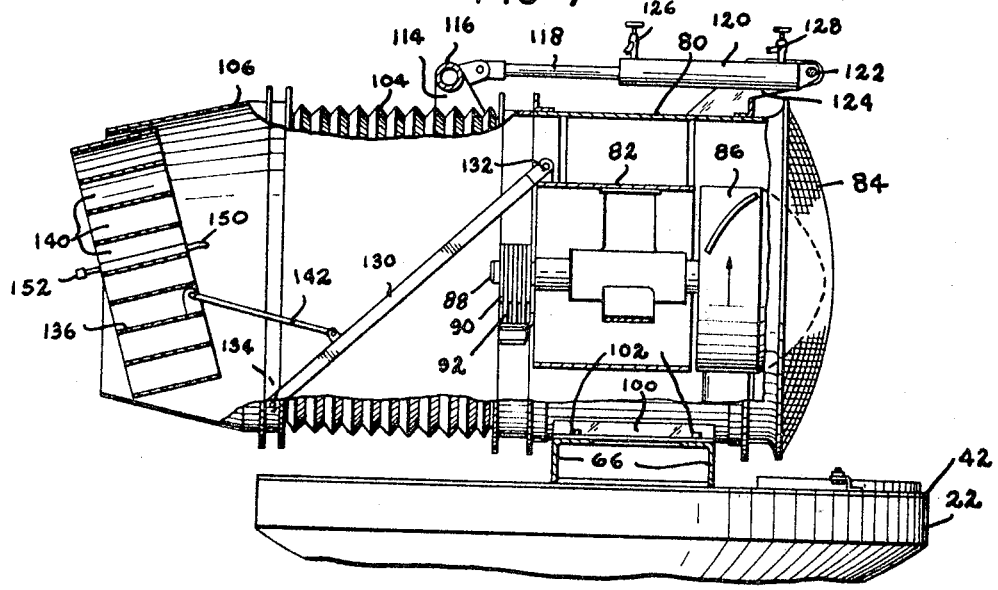
FIGURE 7 is a longitudinal section through the blower device.

FIGURES 6 and 7 show somewhat more in detail the construction and mounting of the blower unit. The blower unit comprises, toward the rear, a cylindrical housing 80 and within which is mounted a somewhat smaller cylindrical sleeve 82. At the extreme rear end is a screened inlet opening 84, and inside the inlet opening is an axial type air impelling element 86 mounted on shaft 88. Shaft 88 has pulley means 90 thereon toward the front end of cylindrical portion 80 and over pulley means 90 is entrained belt means 92 leading to pulley means 94 on the engine output shaft. The belt means 92 passes through an opening 96 provided in the side of the blower housing and this opening includes confining guideways 98 above and below the belts.

FIGURES 6 and 7 will also show that the lower portion of the blower housing has fixed thereto angle members 100, and which extend across the supporting framework so as to support the blower housing thereon. Bolts 102 securely connect the blower housing to the supporting framework made up of angles 66.

The drawings will also show that the discharge end of blower housing 80 is connected by flexible bellows means 104 with an inwardly tapering discharge member 106 through which the air blast passes in leaving the blower. By virtue of the flexible bellows, discharge member 106 is tiltable to a substantial angle so as to adjust the direction of the blast discharged in the vertical plane. To this end, the bars or links 108 are provided which are pivoted at 110 at their front ends to a ring at the back end of discharge member 106 while being pivoted at 112 at their back end to the blower housing 80 near the front end thereof. Each link 108 has upstanding from the rear region thereof, a bracket plate 114 which extends to above the bellows 104.

The bracket plates 114 are interconnected by a transversely extending member 116 and connected to this transversely extending member in about the center is the ram 118 of a hydraulic motor that includes a cylinder 120 in which the ram is reciprocal and which cylinder 120 is pivoted at 122 to bracket means 124 fixed to and upstanding from the rear portion of blower housing 80.

At this point it will be evident that a reversible supply of actuating fluid to cylinder 120 via conduits 126 and 128 will bring about tilting of links 108, as shown in FIGURES 3, 4 and 5, and this will cause movement of discharge member 106.

This movement of member 106 results in tilting thereof because of a strut member 130 which is provided in the blower assembly and which strut at its back end is pivoted at 132 to a point on the front of the upper end of inner sleeve member 82, whereas at its front end link 130 is pivoted at 134 to a point in the region of the bottom of the back region of discharge member 106. As will be seen in FIGURES 3, 4 and 5 the provision of the strut causes discharge member 106 to tilt as it is moved by links 108. The tilting of the discharge member is such that it assumes a greater angle than the angle to which links 108 are moved, so that with only about a 40 degree movement of links 108 discharge member 106 can be caused to move about 80 degrees.

The direction of the blast coming from discharge member 106 is caused to vary still further by the provision of a honeycomb-like guide means 136 provided in the exit end of discharge member 106 and pivoted thereto as by the pivots 138 on each side of member 136. Member 136 comprises a plurality of channels or passages 140 by means of which the air blast is confined and guided in a direction corresponding to the tilted position of member 136.

Member 136 is caused to tilt in the desired manner by the provision of a link 142 connected between a point on member 136 spaced laterally from the axis which the pivot means 138 define while link 142 is connected at its other end to a point on link 130 between the center of the said link and its pivotal connection at 134 to the discharge member 106. As will be seen in FIGURES 3, 4 and 5, additional link 142 provides for tilting of member 136 in the same direction as discharge member 106, but at a more rapid rate so that, whereas in FIGURE 7 the discharge member 106 is directed horizontally while member 136 is directed about 15 degrees downwardly, in FIGURE 9 the discharge member 106 is tilted upwardly at an angle of about 80 degrees whereas discharge member 136 is directed substantially vertically.

As will best be seen in FIGURE 7, there is a supply conduit 150 which extends substantially axially through deflector or guide member 136 and is carried by the said member, and which terminates at its outer end in a nozzle 152. The liquid treatment material supplied to conduit 150 will be discharged from nozzle 152 and distributed in the air stream passing through member 136 so as to be carried by the said air stream to the vegetation to be treated.

The supply of treatment material through conduit 150 comes from tank 22 from which it passes by way of conduit means 154, which may, but does not need to be, a flexible hose to the inlet of a high pressure pump 156, the discharge side of which is connected by conduit 158 with conduit 150. Reference to FIGURE 8 will show that conduit 158 is also connected by an adjustable relief valve 160 with the tank for relieving excessive pressures within the system.

Upstream valve 160 is a branch conduit 162 which leads into the tank and is connected with a conduit 164 in the tank extending substantially diametrically thereof, and terminating in a pair of opposed jets 166. During operation of pump 156 a continuous supply of treatment liquid issues from jets 166 and thereby maintains the treatment liquid in tank 22 in a condition of motion and maintains the treatment liquid completely mixed at all times.

Conduit 158 ahead of conduit 150 passes through a valve 170 which is adapted for being foot operated by a foot lever 172, and to this end is positioned adjacent the operator's position in the spraying apparatus. Valve 170 includes a valve body having an inlet port to which conduit 158 is connected and having an outlet port to which conduit 150 is connected. Between these ports is a member 174 forming a valve seat and a valve member 176 is urged toward the seat by a spring 178.

The valve member is urged off the seat by a plunger 180 under the control of foot lever 172. By this simple arrangement, the machine operator can control the supply of treatment liquid to the air blast while at the same time the liquid in the tank 22 is mixed and circulated all of the time that pump 156 is running. Furthermore, opening and closing of valve 170 does not damage pump 156 because of the provision of relief valve 160.

The pump 156 is provided with a large drive pulley 182 connected by belts 184 with a relatively small pulley on the engine output shaft 70. The speed reduction effected by the pulleys permits the pump to operate at the proper speed while the engine runs at the proper speed to drive the fan at its rated speed and thereby produce the required air blast.

FIGURE 8 also shows that the spraying apparatus includes a hydraulic pump 190 driven by belts 192 entrained over pulley means on the engine output shaft 70, and on the pump input shaft. Pump 190 supplies conduit means 194 leading to a torque device 196 forming a part of the steering mechanism for the spraying apparatus, and also leads to the inlet of a reversing valve 198 which has service ports connected to the opposite ends of cylinder 120. An operating lever 200 provided for valve 198 is located adjacent the operator's position on the spraying apparatus and is availed of for effecting tilting of the blast from the spraying apparatus in a vertical plane.

The seat portion 212, as will be seen in FIGURE 2, is a combined seat and fuel tank. To this end, the seat portion is made up of the lower portion 214 and upper portion 216 interconnected by the mating flanged regions 218 thereof. Upper portion 216 is formed with a step so that it can receive a seat cushion 220, and a back rest cushion 222. The tank is provided with a filling opening 224 and connections are made to the tank at 226 for drawing fuel therefrom. The combination of the seat and fuel tank is preferably made of fiber glass reinforced plastic material and is extremely strong and at the same time is compact and therefore saving of space. The fiber glass reinforced plastic material is highly impact resistant so that full safety is realized by constructing the seat and fuel tank in the described manner.

While the tilting of the discharge member is readily accomplished by manipulation of lever 200 and valve 198, FIGURE 9 shows an advantageous modification of this control. In FIGURE 9, valve 198a, which corresponds to valve 198 of FIGURE 8, has an operating lever 200a which is connected by a link 230 with tiltable portion 232 of the steering column. Thus, by swinging the steering column in the fore and aft direction, the operating lever 200a of valve 198a can be actuated and in this manner cause a reversible supply of fluid to cylinder 120 to tilt the discharge member of the blower in a vertical plane.

It will be noted from the drawings that the frame or chassis of the apparatus is provided with tail lights as at 260 while head lights are provided as at 262 on the discharge member of the blower and these latter head lights, of course, always point in the direction in which the blast is being directed. The spraying apparatus according to the present invention can thus be employed in dark regions or even at night, if necessary, and the operator can always observe the results of the said operation.

It will be understood that this invention is susceptible to modification in order to adapt it to different usages and conditions.

What is claimed is:

1. A blower device comprising: stationary housing means having an air inlet and an air outlet and an air impellar in the housing for drawing air in said inlet and impelling it out said outlet, a tubular discharge member spaced in the direction of air flow from said outlet, flexible tubular means connected at one end to said housing around said outlet and at the other end to said discharge member to convey air from the outlet to the discharge member, arm means extending from said discharge member to said housing along opposite lateral sides of said tubular means and pivotally connected at one end to said housing and at the other end to said discharge member, brackets connected to and upstanding from said arms, a connection member extending transversely between and connected to said brackets above said tubular means, a motor connected at one end to said housing and at the other end to said connection member for tilting said arm means about the pivotal connection thereof with said housing, and control means connected at one end to said housing and at the other end to said discharge member and operable for tilting the discharge member about the pivotal connection thereof with said arms simultaneously with and in response to the tilting of said arms about the pivotal connection thereof with said housing.

2. A blower device according to claim 1 in which said control means causes tilting of said discharge member about the pivotal connection thereof with said arms in the same direction as said arms pivot about their pivotal connection with said housing.

3. A blower device according to claim 2 in which said control means is in the form of rigid bar means pivotally connected at one end to one of the upper and lower regions of said discharge member and pivotally connected at the other end to one of the lower or upper regions respectively of said housing.

4. A blower device according to claim 2 in which said air outlet of said housing discharges in the horizontal direction and said arms extend horizontally from said housing to said discharge member when the discharge member is in untilted position and are located in about the transverse central plane of the said air outlet of said housing, said control means comprising a rigid bar extending diagonally through said flexible tubular means and pivoted at one end to the lower portion of said discharge member at the end thereof adjacent said flexible tubular means and at the other end to said housing in the region of the upper portion of said air outlet.

5. A blower device according to claim 1 which includes air guide means pivotally mounted in said discharge member adjacent the discharge end thereof, and means connected to said air guide means operable for tilting said air guide means in said discharge member simultaneously with and in response to tilting of said discharge member about the pivotal connection thereof with said arms.

6. A blower device according to claim 3 which includes air guide means pivotally mounted in said discharge member, and a rigid link pivotally connected at one end to said air guide means and at the other end to said bar means and operable to tilt said air guide means in said discharge member simultaneously with and in response to tilting of said discharge member about its pivotal connection with said arms and in the same direction.

7. A blower device according to claim 6 in which said guide means comprises a cylindrical outer part having radial clearance from said discharge member and baffle members in said outer part extending parallel to the axis thereof.

References Cited

UNITED STATES PATENTS

| | | | |
|---|---|---|---|
| 2,531,566 | 11/1950 | Gostafson. | |
| 2,593,275 | 4/1952 | Daugherty | 239—78 |
| 2,668,082 | 2/1954 | Pasteur | 239—77 |
| 2,706,596 | 4/1955 | Hait | 239—78 |
| 2,738,226 | 3/1956 | Bals | 239—77 |
| 2,938,672 | 5/1960 | Glatfelter | 230—274 XR |
| 3,252,656 | 5/1966 | Greenwood | 230—78 |

FOREIGN PATENTS 631,691  1/1962  Italy.

WILLIAM L. FREEH, *Primary Examiner.*

U.S. Cl. X.R.

239—77